United States Patent [19]

Kuller

[11] Patent Number: 5,147,938
[45] Date of Patent: Sep. 15, 1992

[54] ACRYLATE ADHESIVES CONTAINING POLYMERIZABLE FLUOROCHEMICAL SURFACTANTS

[75] Inventor: Douglas H. Kuller, St. Paul, Minn.

[73] Assignee: Minnesota Mining and Manufacturing Company, St. Paul, Minn.

[21] Appl. No.: 679,431

[22] Filed: Apr. 2, 1991

[51] Int. Cl.$^5$ .................. C08F 2/50; C08F 14/18; C08F 259/08
[52] U.S. Cl. .................. 525/276; 427/54.1; 522/120; 522/121; 522/16; 526/243; 526/245; 526/246
[58] Field of Search .............. 522/121, 120; 525/276; 427/54.1

[56] References Cited

U.S. PATENT DOCUMENTS

| | | | |
|---|---|---|---|
| 3,786,116 | 1/1974 | Milkovich | 525/276 |
| 3,787,351 | 1/1974 | Olson . | |
| 4,181,752 | 1/1980 | Martens et al. . | |
| 4,246,387 | 1/1981 | Deutsch . | |
| 4,303,485 | 12/1981 | Levens . | |
| 4,415,615 | 11/1983 | Esmay et al. . | |
| 4,442,261 | 4/1984 | Kennedy | 525/276 |
| 4,560,599 | 12/1985 | Regen . | |
| 4,569,798 | 2/1986 | Nieh . | |
| 4,617,343 | 10/1986 | Walker et al. . | |
| 4,894,259 | 1/1990 | Kuller . | |
| 4,906,691 | 3/1990 | Joseph | 525/276 |
| 4,916,191 | 4/1990 | Takeuchi | 525/276 |
| 4,929,666 | 5/1990 | Schmidt et al. . | |
| 4,985,473 | 1/1991 | Williams | 522/121 |

FOREIGN PATENT DOCUMENTS 2172889  11/1988  United Kingdom .

OTHER PUBLICATIONS

Paint and Varnish Production, Mar. 1972 (Pike), "Fluorochemical Surfactants", pp. 27–32.
Res. Discl., 1981, pp. 309, 310, Abstract No. 20816.
Chemical Abstracts, vol. 98, #10, Abstract #73066j, 1982.

Primary Examiner—Marion E. McCamish
Assistant Examiner—Arthur H. Koeckert
Attorney, Agent, or Firm—Gary L. Griswold; Walter N. Kirn; Douglas E. Reedich

[57] ABSTRACT

Pressure-sensitive acrylate-based adhesive copolymers comprising polymerized acrylate units and polymerized fluorochemical surfactant units and a process for preparing same. Also prepolymeric compositions comprising the monomeric components of an acrylate-based pressure-sensitive adhesive and a polymerizable fluorochemical surfactant. The prepolymeric compositions generally have surface energy lower than that of the monomeric components of the acrylate-based pressure sensitive adhesive alone. Also, the adhesive compositions better maintain adhesive properties when aged when compared to corresponding adhesive compositions involving non-polymerizable fluorochemical surfactants.

35 Claims, No Drawings

ACRYLATE ADHESIVES CONTAINING POLYMERIZABLE FLUOROCHEMICAL SURFACTANTS

BACKGROUND OF THE INVENTION

1. Field of the Invention

This invention relates to acrylate-containing polymerizable mixtures. In another aspect this invention relates to the use of surfactants, particularly fluorochemical surfactants, in acrylate-containing adhesive compositions.

2. Description of the Related Art

Fluorochemical surfactants are commonly used to lower the surface tension of organic liquids. For example, *Paint and Varnish Production* March, 1972 (Pike) describes the use of fluorochemical surfactants such as FC-430 and FC-431 (3M) in order to improve wetting in solution and solvent-free coating. Problems that can be addressed using fluorochemical surfactants include retracting of the coating into beads, cratering, "orange peel", pigment floating and flooding, and poor leveling.

U.S. Pat. No. 3,787,351 (Olson) describes oligomers containing fluoroaliphatic radicals and poly(oxyalkylene) solubilizing moieties. The oligomers are said to be useful as wetting agents in order to improve the mechanical properties of shaped articles of filled resin composites (e.g., glass-reinforced polyester or epoxy resin composites). Further, U.S. Pat. No. 4,415,615 (Esmay et al.) discloses the use of some of the oligomers of U.S. Pat. No. 3,787,351 as surfactants in the preparation of cellular pressure-sensitive adhesives in order to produce a uniform cell structure.

Non-fluorinated polymerizable surfactants have been described, e.g., in U.S. Pat. No. 4,560,599 (Regen). That patent describes a method for direct stepwise coating of a solid substrate with a polyfunctional polymerizable surfactant. Among the polymerizable surfactants used are methacrylate-functional phosphatidyl cholines and phosphate esters. U.S. Pat. No. 4,569,798 (Nieh) describes amphoteric tertiary amine-substituted acrylamides that are said to be useful as surfactants in aqueous solutions and in the preparation of water-soluble copolymers that have surface active properties.

U.S. Pat. No. 4,246,387 (Deutsch) describes ring-sulfonated maleate half-esters of alkoxylated alkyl arylols, and U.S. Pat. No. 4,617,343 (Walker et al.) describes the use of such surfactants in the preparation of an emulsion polymer for a laminating adhesive.

*Res. Discl.*, 1981, 208, 309 describes the preparation of vinyl surfactants by reacting a surfactant containing a single active hydrogen such as a polyethylene glycol ether of a secondary alcohol with an addition-polymerizable isocyanate such as 2-isocyanato ethyl methacrylate.

*Zh. Fiz. Khim.*, 1982, 56, 2898 (Abstract) describes fluorine-containing acrylates of the formula $CH_2=CHCO_2CH_2(CF_2CF_2)_nR$, wherein R is H or F, and n is 1 to 4, as being useful for imparting hydrophobicity and chemical resistance to the surface of polymers by copolymerization.

U.K. Patent GB 2,172,889 B (Wakatsuki et al.) describes phosphoric esters of the formula

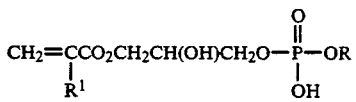

wherein $R^1$ is hydrogen or methyl, R is inter alia a linear or branched fluoroalkyl group which has from 1 to 36 carbon atoms and at least 1 fluorine atom. These compounds are said to have good surface activity, self-organizability, and polymerizability.

SUMMARY OF THE INVENTION

This invention provides a polymeric adhesive composition comprising:

(a) a major amount of polymerized units derived from an acrylate-containing mixture comprising the monomeric components of an acrylate-based pressure-sensitive adhesive; and (b) a minor amount of polymerized units derived from a polymerizable, organic-soluble, oligomeric fluorochemical surfactant comprising one or more fluorinated oligomers, each comprising at least two pendent flouroaliphatic groups, at least two organic-solubilizing groups, and at least one pendent polymerizable olefinic group.

In a preferred embodiment, the fluorinated oligomers in the surfactant composition comprise an oligomeric aliphatic backbone having bonded thereto:

(i) at least two fluoroaliphatic groups, each having a fully fluorinated terminal group;

(ii) at least one organic-solubilizing group, each comprising a plurality of carbon atoms and optionally comprising one or more catenary oxygen atoms; and (iii) at least one polymerizable olefinic group, each fluoroaliphatic group, organic-solubilizing group, and polymerizable olefinic group being independently bonded to the aliphatic backbone through a covalent bond, a heteroatom, or an organic linking group.

In a further preferred embodiment, the polymerizable fluorochemical surfactant composition comprises one or more oligomers comprising a portion represented by Formula I

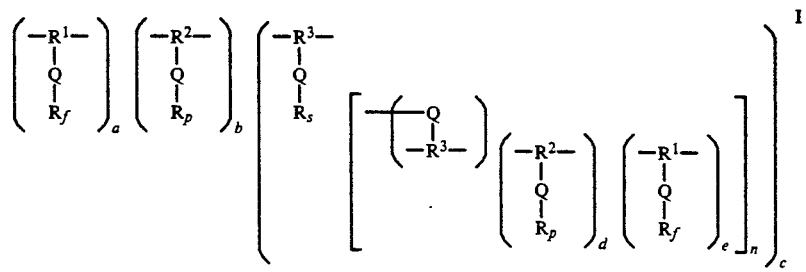

wherein:

$R^1$, $R^2$, and $R^3$ independently represent polymerized units derived from polymerizable olefinic monomers and together form an aliphatic backbone;

each Q independently is a covalent bond, a heteroatom, or an organic linking group;

$R_f$ is a fluoroaliphatic group containing a fully fluorinated terminal group;

$R_s$ is an organic-solubilizing group comprising a plurality of carbon atoms and optionally comprising one or more catenary oxygen atoms;

$R_p$ is a polymerizable olefinic group; and a, b, c, d, and e are whole numbers such that the compound is oligomeric, and each n is independently zero or one.

In embodiments wherein n is zero, the solubilizing groups $R_s$ are pendent and the oligomers are not crosslinked. In embodiments wherein n is one, the solubilizing groups $R_s$ are catenary and the oligomers are crosslinked.

The acrylate-containing mixture preferably comprises a major amount of an alkyl acrylate wherein the alkyl group contains 1 to about 14 carbon atoms and a minor amount of a polar monomer copolymerizable therewith.

This invention also provides a prepolymeric composition comprising a major amount of the monomeric components of an acrylate-based pressure-sensitive adhesive, and a minor amount of a fluorochemical surfactant as described above. In a preferred embodiment of the prepolymeric composition the acrylate-containing mixture is partially polymerized to provide an optimal viscosity for coating.

This invention also provides a process for preparing a pressure-sensitive adhesive composition, comprising the steps of:

(i) combining the monomeric components of an acrylate-based pressure-sensitive adhesive and a photoinitiator;

(ii) optionally partially photopolymerizing the composition from step (i) in order to increase its viscosity for coating purposes;

(iii) combining a polymerizable fluorochemical surfactant as described above with the composition from step (ii) to afford a prepolymeric composition;

(iv) coating the prepolymeric composition from step (iii) onto a substrate; and (v) photopolymerizing substantially completely in an inert atmosphere.

Through copolymerization of the fluorochemical surfactant with the prepolymeric acrylate-containing mixture, the adhesive compositions of the invention generally maintain adhesive performance over time and avoid the reduced adhesive performance associated with the migration of surfactant to the surface of cured adhesive compositions. Further, copolymerization allows the surfactant to remain dispersed throughout the composition and avoids the coalescence of surfactant into larger droplets. Accordingly, the adhesive compositions of this invention can be used in the preparation of pressure-sensitive adhesive coatings that coat well due to the presence of surfactant but do not exhibit a reduction in adhesive performance upon aging.

This invention also provides adhesive transfer tapes comprising a low adhesion carrier with a layer of polymeric adhesive as described above thereon. The adhesive transfer tapes of the invention are repositionable for a period of time after initial placement on a substrate, after which time the adhesive bond becomes "permanent". Thus, the adhesive compositions and transfer tapes of the invention find application, for example in the assembly of membrane switches, where two or more layers are to be adhered to one another with precise placement of the respective layers; if the layers are initially misplaced they can be repositioned rather than discarded.

DETAILED DESCRIPTION OF THE INVENTION

The polymeric adhesive compositions of the invention comprise polymerized units derived from polymerizable fluorinated oligomers. Formulas used herein to represent the structures of the fluorinated oligomers indicate the presence of chains of randomly polymerized units derived from several types of monomers; those formulas are not intended to indicate ordering of units, e.g., "blocks" of units such as in a block copolymer, or alternating units in the chain. The terms "oligomer" or "oligomeric" when used herein designate compounds containing a plurality of polymerized units, but fewer than that number of polymerized units present in a polymer, e.g., chains of 5 to about 100 polymerized units.

The fluoroaliphatic group is designated herein as $R_f$. $R_f$ is a stable, inert, nonpolar, preferably saturated monovalent moiety which is both oleophobic and hydrophobic. A fluorinated oligomer preferably comprises from 2 to about 25 $R_f$ groups and preferably comprises about 5 percent to about 30 percent, and more preferably about 8 percent to about 20 percent fluorine by weight based on the total weight of the oligomer, the loci of the fluorine being essentially in the $R_f$ groups. $R_f$ preferably contains at least about 3 carbon atoms, more preferably 3 to about 20 carbon atoms, and most preferably about 6 to about 12 carbon atoms. $R_f$ can contain straight chain, branched chain, or cyclic fluorinated alkyl groups or combinations thereof or combinations thereof with straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2-$, $(CF_3)_2CF-$, $-CF_2SF_5$, or the like. Perfluorinated aliphatic groups, i.e., those of the formula $C_nF_{2n+1}$, are the most preferred embodiments of $R_f$.

The organic-solubilizing group is designated herein as $R_s$. A fluorinated compound preferably comprises sufficient $R_s$ groups to render the compound soluble in organic media such as conventional solvents, e.g., ketones, esters, and hydrocarbons, and polymerizable mixtures of acrylic and methacrylic acids, acrylates and methacrylates, and the like. The particular preferred number of $R_s$ groups will depend on the nature of the particular $R_s$ groups and the particular medium in which the compound is intended to be solubilized. Generally, however, a plurality of $R_s$ groups is preferred, e.g., 2 to about 60, more preferably 4 to about 30. Each $R_s$ contains at least 4 carbon atoms and optionally contains at least one catenary oxygen atom. $R_s$ preferably contains from 8 to about 50 carbon atoms and can be straight chain, branched chain, cyclic, or any combination thereof. The solubilizing group is preferably pendent to the fluorinated oligomer. In such instances n in Formula I is zero. It can also be a catenary group, in which case n in Formula I is one. Both pendent and catenary solubilizing groups can be present, in which case at least one n is zero and one n is one. Preferred $R_s$ groups include polyoxyalkylenyl groups, e.g., polyoxyethylene or polyoxyethylenyl, and straight chain, branched chain, or cyclic alkyl or alkylene groups, e.g., butyl, butylene, octyl, octylene, isooctyl, isooctylene, octadecyl, or octadecylene, and combinations thereof.

The polymerizable olefinic group is designated herein as $R_p$. The fluorinated compound is polymerized into an adhesive composition of the invention through $R_p$. $R_p$ can be any olefinic group that is capable of undergoing a free-radical polymerization reaction. Examples of such groups include ethenyl as found in, e.g., an acrylate or a vinyl ether, and 2-propenyl as found in, e.g., a methacrylate. A fluorinated compound can contain a plurality of polymerizable olefinic groups and preferably contains one polymerizable olefinic group.

The polymerizable fluorochemical surfactant compositions will be further illustrated with reference to the preferred embodiment shown in Formula I.

In the preferred embodiment illustrated in Formula I, the aliphatic backbone comprises a sufficient number of polymerized units to render the compound oligomeric. It is preferred that the backbone comprise about 5 to about 100 polymerized units, more preferably 10 to about 50, and most preferably 20 to about 40. A single polymerized unit can contain more than one type of pendent group. However, the polymerized units are preferably derived from fluorinated monomers, i.e., those containing a fluoroaliphatic group, bifunctional monomers, i.e., those containing a functional group that can be converted or further elaborated into a polymerizable olefinic group, and solubilizing monomers, i.e., those containing solubilizing groups. The relative and absolute numbers of the several types of polymerized units in a compound are preferably such that the preferred number of the several types of corresponding pendent groups are present in the oligomer. Accordingly, with reference to Formula I, it is preferred that the sum of a and all occurrences of e is about 2 to about 25, more preferably 5 to about 15; the sum of b and all occurrences of d is at least 1 to about 60, more preferably 2 to about 30; and c is about 2 to about 60, more preferably 4 to about 30.

The ratio of moles of the several types of polymerized units, and therefore the number of fluorinated, solubilizing, and polymerizable olefinic groups, in the aliphatic backbone will not be the same in each oligomer present in a composition of the invention. Therefore compositions and oligomers of the invention are generally characterized herein with respect to the overall ratio of polymerized units derived from each of the several types of monomers, which is determined primarily by the relative amounts thereof used in the preparation of the composition.

The fluorinated, solubilizing, and polymerizable groups are linked to the aliphatic backbone by a linking group designated Q in Formula I. Linking group Q can be a covalent bond, heteroatom, e.g., O or S, or an organic moiety. The linking group Q is preferably an organic moiety containing 1 to about 20 carbon atoms, optionally containing oxygen, nitrogen-, or sulfur-containing groups or a combination thereof, and preferably free of functional groups, e.g., polymerizable olefinic double bonds, thiols, easily abstracted hydrogen atoms such as cumyl hydrogens, and other such functionality known to those skilled in the art, that substantially interfere with free-radical oligomerization. Examples of structure suitable for linking group Q include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene. Preferred linking groups Q can be selected according to ease of preparation and commercial availability and will differ depending on whether it links $R_f$, $R_s$, or $R_p$ to the aliphatic backbone.

Below is a partial representative list of suitable organic Q groups. For the purposes of this list, each k is independently an integer from 1 to about 20, g is an integer from 0 to about 10, h is an integer from 1 to about 20, R' is hydrogen, phenyl, or alkyl of 1 to about 4 carbon atoms, and R'' is alkyl of 1 to about 20 carbon atoms.

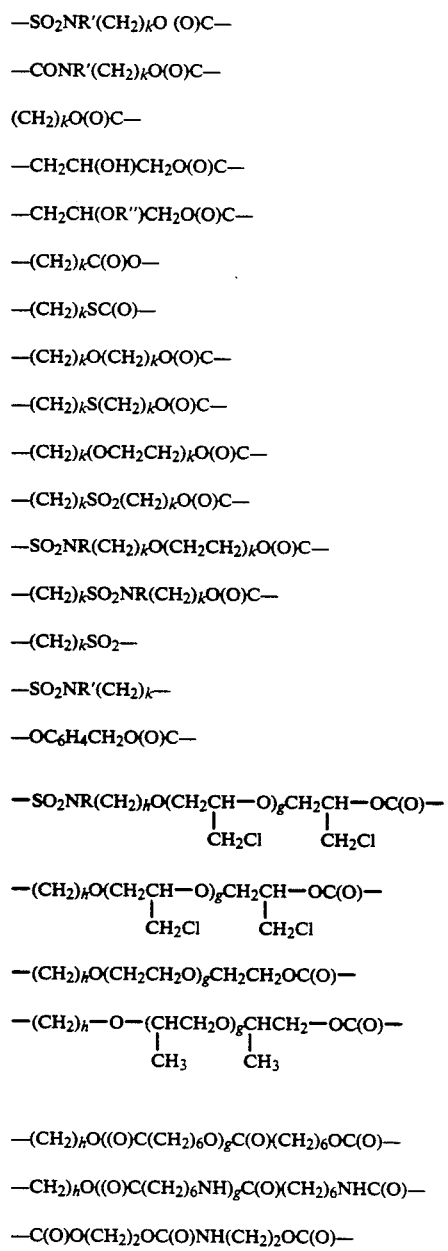

For linking $R_f$, Q is preferably alkylene or sulfonamido, or sulfonamidoalkylene. For linking $R_s$, Q is preferably carbonyloxy. For linking a $R_p$ group, Q is preferably —C(O)O(CH$_2$)$_2$OC(O)NH(CH$_2$)$_2$OC(O)—.

The aliphatic backbone of course does not exist in the form shown in Formula I. Rather it is terminated on each end by hydrogen or by some organic group (not shown in Formula I). The terminal groups are present by virtue of the method used to prepare the compositions. The particular terminal groups present in a particular fluorinated compound are not unduly critical to the function of the compositions of the invention. Typical terminal groups include hydrogen or an alkylthio group, which would be derived from an alkylthiol chain transfer agent.

The polymeric adhesive composition also comprises polymerized units derived from the monomeric components of an acrylate-containing mixture. The acrylate-containing mixture comprises the monomeric components of an acrylate-based pressure-sensitive adhesive. The identity and relative amounts of such components are well known to those skilled in the art. Particularly preferred among acrylate-containing mixtures are those containing an alkyl acrylate, preferably a monofunctional unsaturated acrylate ester of a non-tertiary alkyl alcohol, wherein the alkyl group contains 1 to about 14 carbons atoms. Included within this class of monomers are, for example, isooctyl acrylate, isononyl acrylate, 2-ethylhexyl acrylate, decyl acrylate, dodecyl acrylate, n-butyl acrylate, and hexyl acrylate. Preferred monomers include isooctyl acrylate, isononyl acrylate, and butyl acrylate.

Optionally and preferably, polar copolymerizable monomers are present in the acrylate-containing mixture. Inclusion of a polar copolymerizable monomer in the acrylate-containing mixture improves adhesion of the final adhesive composition to metals and also improves cohesion in the final adhesive composition. Strongly polar and moderately polar copolymerizable monomers can be used. Strongly polar copolymerizable monomers include acrylic acid, itaconic acid, hydroxyalkyl acrylates, cyanoalkyl acrylates, acrylamides, and substituted acrylamides. A strongly polar copolymerizable monomer preferably constitutes a minor amount, e.g., up to about 25%, more preferably up to about 15%, of the acrylate-containing mixture. When strongly polar copolymerizable monomers are present, the alkyl acrylate monomer generally constitutes a major amount of the monomers in the acrylate-containing mixture, e.g., at least about 75% by weight of the monomers.

Moderately polar copolymerizable monomers include N-vinyl pyrrolidone, acrylonitrile, vinyl chloride, and diallyl phthalate. A moderately polar copolymerizable monomer preferably constitutes a minor amount, e.g., up to about 40%, more preferably from 5% to about 40%, of the acrylate-containing mixture. When moderately polar copolymerizable monomers are present, the alkyl acrylate monomer generally constitutes at least about 60% of the acrylate-containing mixture.

The polymeric adhesive composition is preferably crosslinked.

The polymeric adhesive compositions of the invention comprise a major amount of polymerized units derived from the acrylate-containing mixture and a minor amount of polymerized units derived from the fluorinated surfactant. Preferably, the fluorinated units are present in an amount effective to reduce the surface tension of the composition relative to the acrylate-based pressure-sensitive adhesive. The amount that constitutes an effective amount will vary with the particular surfactant and acrylate-containing mixtures used, but generally about 0.05 to about 2 percent surfactant by weight based on the weight of the composition is suitable, about 0.1 to about 1 percent surfactant is preferred, and about 0.2 percent is most preferred.

The polymeric adhesive compositions of the invention can contain other materials such as fillers, pigments, plasticizers, tackifiers, fibrous reinforcing agents, woven and nonwoven fabrics, foaming agents, antioxidants, stabilizers, fire retardants, and viscosity adjusting agents. Such materials can be used in any suitable amount, which can be easily determined by those skilled in the art.

An especially useful filler is hydrophobic silica as disclosed in U.S. Pat. Nos. 4,710,536 and 4,749,590 (Klingen et al.), both of which are incorporated herein by reference.

Other auxilliary agents that can be used in the prepolymeric and adhesive compositions include glass or polymeric microspheres. The microspheres should have an average diameter of 10 to 200 micrometers, and can constitute about 5 to about 65 volume percent of the layer. Suitable polymeric microspheres include those disclosed in U.S. Pat. No. 4,287,308 (Nakayama), incorporated herein by reference.

Hydrocarbon elastomers, e.g., styrene-butadiene block copolymers, can also be incorporated in order to improve adhesion to high-solids paints, as disclosed in commonly assigned copending U.S. Ser. No. 07/210,712, filed Jun. 28, 1988. Such elastomers preferably constitute about 5 to about 35 parts by weight of the composition based on 100 parts by weight of the composition.

Fluorinated surfactant compositions having pendent solubilizing groups (e.g., non-crosslinked compositions wherein n of Formula I is zero) can be prepared as shown in the Reaction Scheme below, wherein $R^1$, $R^2$, $R^3$, Q, $R_f$, $R_s$, $R_p$, a, b, and c are as defined above. G is a linking group that corresponds to, will be converted to, or will be further elaborated to linking group Q. Each R is hydrogen, halogen, or methyl, and $R_b$ is a group that can be converted or further elaborated into a polymerizable olefinic group. The groups that terminate the oligomeric chains are not shown in the Reaction Scheme.

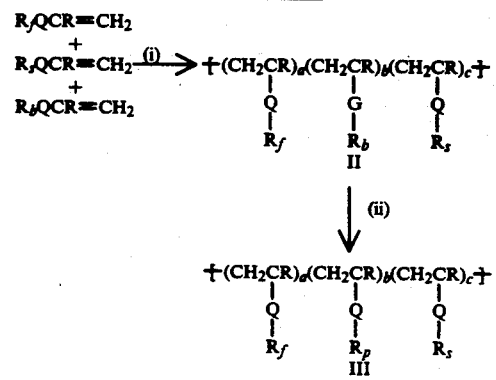

In step (i) of the Reaction Scheme, fluorinated, solubilizing, and bifunctional monomers are oligomerized to form an intermediate of Formula II. $R_b$ in a compound of Formula II and in a bifunctional monomer is a group that can be converted or further elaborated into a polymerizable double bond. $R_b$ can be, for example, a group that is susceptible to a reaction such as nucleophilic or electrophilic attack by a reagent that contains a polymerizable olefinic group. Exemplary groups of this nature include: epoxy, azlactone (i.e., 2-oxazoline-5-one), acyl halide, alkyl halide, carboxylic anhydride, isocyanato, and other electrophilic groups; and hydroxy, amino, and other nucleophilic groups. Bifunctional monomers containing such groups are well known and generally commercially available or easily prepared by those skilled in the art. Exemplary bifunctional monomers include 2-alkenyl-2-oxazolin-5-ones such as 2-ethenyl-2-oxazoline-5-one, and 2-propenyl-2-oxazolin-5-one; acrylamide; methacrylamide; maleamide; maleimide; N-isopropyl acrylamide; glyoxal bisacrylamide; N-methylol acrylamide; N-methylol methacrylamide; diacetone acrylamide and methacrylamide; methylolated diacetone acrylamide and methacrylamide; 2-hydroxy-3-chloropropyl acrylate and methacrylate; hydroxy $C_2$ to $C_4$ alkyl acrylates and methacrylates; aziridinyl acrylate and methacrylate; maleic anhydride; allyl alcohol; allyl glycolate; isobutenediol; allyloxyethanol; o-allyl phenol; divinyl carbinol; glycerol α-allylether; acrylic acid, methacrylic acid and metal salts thereof; vinylsulfonic and styrene p-sulfonic acids and their metal salts; 3-aminocrotonitrile; monoallylamide; 2-acrylamido-2-methylpropanesulfonic acid (AMPS) and its salts; glycidylacrylate and methacrylate; allyl glycidyl ether; acrolein; N,N-dimethylaminoethyl acrylate and methacrylate; N-tert-butylaminoethyl methacrylate; isocyanates containing olefinic unsaturation such as isocyanatoethyl methacrylate, bis(2-isocyanato ethyl)-fumarate, methacroyl isocyanate, 1(1'-isocyanato-1'-methylethyl)- 3-(1'-methylethenyl benzene (available as M-TMI from American Cyanamide), and allylisocyanate; halogenated lower olefinic hydrocarbons such as 3-chloro-2-isobutene, allyl bromide, allyl chloride, and methallyl chloride; vinyl esters such as vinyl acetate, vinyl propionate, vinyl isobutyrate, vinyl succinate, vinyl stearate, divinylcarbonate; allyl esters such as allyl acetate and allyl heptanoate; vinyl alkyl ketones such as vinyl methyl ketone; unsaturated acids such as acrylic, α-chloro acrylic, α-fluoro acrylic, crotonic, maleic, fumaric, itaconic, and citraconic acids, and anhydrides and esters thereof such as dimethyl maleate, ethyl crotonate, acid methyl maleate, acid butyl itaconate, and $C_1$ to $C_4$ alkyl acrylates and methacrylates.

Solubilizing monomers are well known and generally commercially available or easily prepared by those skilled in the art. Exemplary solubilizing monomers include $C_2$ and longer, preferably $C_4$ and longer alkyl acrylate and methacrylates such as isobutyl methacrylate, isooctyl acrylate, octadecyl methacrylate and the like; acrylates and methacrylates of polyalkylene glycols, such as triethyleneglycol acrylate; acrylates and methacrylates of methoxypolyethylene glycols and polyethylene glycols (available as CARBOWAX TM), block copolymers of ethylene oxide and propylene oxide endcapped by hydroxy groups (available as PLURONIC TM), and tetramethyleneoxide glycols (available as TERATHANE TM); and acrylamides and methacrylamides of amino-terminated polyethers (available as JEFFAMINE TM)

Fluorinated monomers and methods for the preparation thereof are known and disclosed, e.g., in U.S. Pat. Nos. 2,803,615 (Ahlbrecht et al.) and 2,841,573 (Ahlbrecht et al.) which disclosures are incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like. Particular fluorinated monomers include N-methyl perfluorooctanesulfonamidoethyl acrylate, N-methyl perfluorooctanesulfonamidoethyl methacrylate, N-ethyl perfluorooctanesulfonamidoethyl acrylate, N-methyl-perfluorohexylsulfonamidoethyl acrylate, the reaction product of isocyanatoethyl methacrylate and N-methyl-perfluorooctanesulfonamidoethyl alcohol, perfluorooctyl acrylate, N-methyl perfluorooctanesulfonamidoethyl vinyl ether, and $C_8F_{17}SO_2NHCH_2CH=CH_2$, and others such as perfluorocyclohexyl acrylate, and tetrameric hexafluoropropyleneoxide dihydroacrylate.

In step (i) of the Reaction Scheme the several types of monomers are present in the amounts necessary to afford a product containing the desired relative numbers of each type of monomer. Also present in step (i) is a chain-transfer agent that can serve to terminate the oligomeric chain at the proper length, thus controlling the absolute numbers of each type of monomer in the compound. Suitable chain-transfer agents contain a group capable of propagating and terminating a free-radical reaction and are well known to those skilled in the art. Representative chain transfer agents include thiols such as ethanethiol, propanethiol, butanethiol, n-octylthiol, t-dodecylthiol, 2-mercaptoethyl ether, 2-mercaptoimidazole, and the like. The chain-transfer agent is present in step (i) in an amount sufficient to control the number of polymerized units in the aliphatic backbone. The chain-transfer agent is generally used in an amount of about 1 to about 20 mole percent, preferably about 3 to about 10 mole percent, based on the number of moles of monomers in the reaction.

Also present in step (i) is a free-radical initiator. Such compounds are known to those skilled in the art and include persulfates, azo compounds such as azoisobutyronitrile and azo-2-cyanovaleric acid and the like, hydroperoxides such as cumene, t-butyl, and t-amyl hydroperoxide, dialkyl peroxides such as di-t-butyl and dicumyl peroxide, peroxyesters such as 1-butyl perbenzoate and di-t-butylperoxy phthalate, diacylperoxides such as benzoyl peroxide and lauroyl peroxide.

A suitable amount of initiator depends on the particular initiator and other reactants being used. About 0.1 percent to about 5 percent, preferably about 0.1 percent, to about 1 percent, by weight of an initiator can be used, based on the total weight of all other reactants in the reaction.

Step (i) is preferably carried out in an inert atmosphere such as for example in an atmosphere of dry nitrogen. Step (i) can be carried out in any solvent suitable for organic free-radical reactions. The reactants can be present in the solvent and can be any suitable concentration, e.g., from about 5 percent to about 90 percent by weight based on the total weight of the reaction mixture. Examples of suitable solvents include: aliphatic and alicyclic hydrocarbons, e.g., hexane, heptane, and cyclohexane; aromatic solvents, e.g., benzene, toluene, and xylene; ethers, e.g., diethylether, glyme, diglyme, and diisopropyl ether; esters, e.g., ethyl acetate and butyl acetate; ketones, e.g., acetone, methyl-ethyl ketone, and methyl isobutyl ketone; sulfoxides, e.g., dimethyl sulfoxide; amides, e.g., N,N-dimethylformamide and N,N-dimethylacetamide; halogenated solvents, e.g., methylchloroform, FREON TM 113, trichloroethylene, and α,α,α-trifluorotoluene; and the like, and mixtures thereof.

Likewise, step (i) can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The product of step (i), an oligomer of Formula II, can be elaborated or converted in one or more steps via conventional methods to include further or different functional groups. The product, however, will still be within the ambit of Formula II. For example, a hydroxy-functional oligomer can be reacted with an epichlorohydrin to provide a further oligomer with both hydroxy and chloro groups. As a further example, an acid-functional oligomer can be reduced by methods known to those skilled in the art to provide a hydroxy-functional oligomer, which can then be reacted with caprolactam to provide an amine-functional oligomer also containing an ester linkage.

In step (ii) an oligomer of Formula II is converted or further elaborated to comprise a polymerizable olefinic group $R_p$. Any one of numerous reactions can be carried out in step (ii). Step (ii) generally involves the reaction of an $R_b$ group with a reagent comprising a polymerizable olefinic group and a functional group that is reactive to $R_b$. Conventional reactions, such as nucleophilic addition, electrophilic addition, and free-radical addition reactions can be used. Generally, conventional conditions are suitable for effecting the various reactions that can be used in step (ii). Particular conditions are well known to those skilled in the art and will depend on the nature of the group $R_b$ and the nature of the reagent selected to react with $R_b$.

A method of preparing a fluorochemical surfactant composition having catenary solubilizing groups, e.g., a crosslinked composition wherein n in Formula I is one, involves using in step (i) a bifunctional solubilizing monomer, i.e., one that contains a solubilizing group that connects two polymerizable olefinic moieties, instead of the illustrated monofunctional solubilizing monomer. Examples of suitable bifunctional solubilizing monomers include diacrylates and dimethacrylates of polyoxyalkylene diols such as those available as CARBOWAX TM 1000, 1450, and 3350. When such a bifunctional solubilizing monomer is used, step (i) produces a lightly crosslinked fluorinated oligomer comprising catenary solubilizing groups. Depending on the nature of the $R_b$ group, the product of the alternate step (i) can be converted or further elaborated as described above in connection with step (ii) to afford a polymerizable fluorochemical surfactant composition.

The polymeric adhesive compositions of the invention can be mixed, coated, and cured according to general solventless methods known to those skilled in the art and disclosed, e.g., in U.S. Pat. No. 4,181,752 (Martens et al.) incorporated herein by reference.

Generally, an acrylate-containing mixture can be prepared by dissolving or dispersing the optional elastomer (if any) into the acrylate monomer and then adding the optional polar copolymerizable monomer (if any), and a photoinitiator. Suitable photoinitiators include benzoin ethers, substituted benzoin ethers such as benzoin methyl ether or benzoin isopropyl ether, substituted acetophenones such as 2,2-diethoxyacetophenone, and 2,2-dimethoxy-2-phenyl-acetophenone, substituted alpha-ketols such as 2-methyl-2-hydroxypropiophenone, aromatic sulphonyl chlorides such s 2-naphthalene sulphonyl chloride, and photoactive oximes such as 1-phenyl-1,1-propanedione-2-(O-ethoxycarbonyl)-oxime. Generally, the photoinitiator is present in an amount sufficient to initiate photopolymerization of the acrylate-containing mixture, e.g., about 0.01 part to about 1.0 parts by weight based on 100 parts of monomer.

Optional crosslinking agents or other additives can also be incorporated. Preferred crosslinking agents for acrylate pressure-sensitive adhesives include multifunctional acrylates such as 1,6-hexanediol diacrylate as well as those disclosed in U.S. Pat. No. 4,379,201 (Heilmann et al.), incorporated herein by reference, such as trimethylolpropane triacrylate, pentaerythritol tetracrylate, 1,2-ethylene glycol diacrylate, and 1,2-dodecanediol diacrylate. Crosslinking is especially easy to control when photopolymerizing the monomer in admixture with a multiacrylate crosslinking agent. Other useful crosslinking agents include the substituted triazines, such as those disclosed in U.S. Pat. Nos. 4,329,384 and 4,330,590 (Vesley), both incorporated herein by reference, e.g., 2,4-bis(trichloromethyl)-6-p-methoxystyrene-S-triazine. The crosslinking agent is typically present in the range of from about 0.01% to about 5% by weight based on the total weight of monomers in the mixture.

This acrylate-containing mixture can then be partially polymerized in order to increase its viscosity for coating purposes. Polymerization to an optimal viscosity of about 500 cps to about 50,000 cps, preferably about 3,000 cps, is preferred.

The fluorochemical surfactant composition is then added to the acrylate-containing mixture to form a prepolymeric composition of the invention. The fluorochemical surfactant is preferably added in an amount sufficient to reduce the surface energy of the prepolymeric composition relative to the acrylate-containing mixture in order to improve coating properties. Suitable amounts of fluorochemical surfactant are as described above in connection with polymeric adhesive compositions of the invention.

In order to control polymer chain length during cure of the composition, a chain-transfer agent can be included in a prepolymeric composition. Suitable chain transfer agents are well known to those skilled in the art and can be used in any suitable amount, e.g., a thiol chain-transfer agent is preferably used in an amount of about 0.05 to about 1 percent by weight.

The prepolymeric composition can then be coated onto a substrate and substantially completely photopolymerized in an inert, i.e., substantially oxygen-free, atmosphere, e.g., a nitrogen atmosphere. Suitable substrates include low-adhesion carriers including siliconized sheet materials such as siliconized polyethylene coated paper and siliconized polymer (e.g., polyethylene, polypropylene, or polyester) films.

For the photopolymerization, a sufficiently inert atmosphere can also be achieved by covering the coating with a plastic film that is substantially transparent to the selected wavelength of ultraviolet radiation, and irradiating through that film in air. If, instead of covering the coating, the photopolymerization is to be carried out in an inert atmosphere, the permissible oxygen content of the inert atmosphere can be increased by mixing into the prepolymeric composition an oxidizable tin compound as taught in U.S. Pat. No. 4,303,485 (Levens), incorporated herein by reference, which also teaches that such procedures will allow thick coatings to be photopolymerized in air.

The compositions of the invention can be used in the form of adhesive transfer tapes, pressure-sensitive adhesive tapes, foam tapes as disclosed e.g., in U.S. Pat. No. 4,415,615 (Esmay et al.), incorporated herein by reference, and multi-layered pressure-sensitive adhesive tapes such as those described in U.S. Pat. No. 4,894,259 (Kuller), incorporated herein by reference.

The compositions of the invention were tested according to the test methods set forth below.

90° Peel Adhesion

The adhesive layer to be tested is transferred to a chemically primed, 50 μm aluminum foil backing which is then slit to a width of 1.27 cm (½ inch). The resulting tape is placed such that one end protrudes over the edge of a smooth substrate plate, e.g., stainless steel, acrylonitrile/butadiene/styrene copolymer, or the like as indicated in the Tables below where test results appear. The tape is adhered to the substrate plate under the weight of a 2.04 kg hard-rubber-covered steel roller. Two passes in each direction are made with the roller. One end of the tape extends beyond the edge of the substrate plate and is thereby left free in order to allow the tape to be pulled by a tensile tester. After exposure to the indicated conditions, 90° peel adhesion is measured by moving the free end of the tape away from the substrate plate at 90° and at a rate of about 0.5 cm per second using a tensile tester. Conditions are indicated in the Examples below as follows:

IN = initial 15 minute residence time of adhesive on test substrate before peel test
3RT = three days residence time at room temperature before peel test
3HA = three days residence time at 70° C. (conditions representing accelerated aging)

Surface Tension

Surface energies were measured using the Du Nouy ring method on a Fischer Surface Tensiomat Model 21.

In the following surfactant preparations and Examples, all reactions were run under an atmosphere of dry nitrogen, and all parts and percentages are by weight unless otherwise indicated. The particular materials and amounts thereof recited in the Examples, as well as other conditions and details, should not be construed to unduly limit the invention.

SURFACTANT PREPARATION

Surfactant A

Part A

In an approximately 950 mL bottle was placed 75.0 g (0.120 mole) of N-ethyl perfluoro(octane)-sulfonamidoethyl methacrylate, 117.5 g (0.146 mole) of CARBOWAX ™ 750 acrylate, 25.0 g (0.216 mole) of hydroxyethyl acrylate, 250 g of ethyl acetate solvent, 5.0 g (0.034 mol) of n-octyl thiol and 0.625 g of azoisobutyronitrile. The bottle and contents were deaerated under reduced pressure, purged with nitrogen, capped tightly, then heated and agitated in a Launder-O-Meter at 65° C. for 16 hours to afford a hydroxyfunctional intermediate of Formula II. The bottle was cooled, degassed under reduced pressure, and purged with air.

Part B

To the solution from Part A was added 32.5 g (0.21 mole) of isocyanatoethyl methacrylate, 0.25 g hydroquinone monomethyl ether as a polymerization inhibitor, and 0.25 g of stannous octoate as a catalyst (Catalyst T-9, available from M & T Chemicals, Inc.). The capped bottle was heated at 70° C. for 5 hours in a Launder-O-Meter. Infrared analysis of the clear, dark amber polymer solution showed no unreacted isocyanato groups and indicated the presence of urethane, methacrylate, fluoroaliphatic, and polyoxyethylene groups.

Surfactants B-Q

Following the general procedure used to prepare Surfactant A, additional surfactants were prepared. The particular monomers, other reactants, and catalysts are set forth in Table 1 below wherein EtFOSEMA represents $C_8F_{17}SO_2N(C_2H_5)C_2H_4OC(O)(CH_3)C=CH_2$;
EtFOSEA represents $C_8F_{17}SO_2N(C_2H_5)C_2H_4OC(O)CH=CH_2$;
MeFOSEA represents $C_8F_{17}SO_2N(CH_3)C_2H_4OC(O)CH=CH_2$;
ZONYL BA MA represents $C_nF_{2n+1}C_2H_4OC(O)C(CH_3)=CH_2$, n=6–12;
CARBOWAX 750A represents $CH_3O(C_2H_4O)_m-C(O)CH=CH_2$, m=about 18;
ODMA represents $C_{18}H_{37}OC(O)C(CH_3)=CH_2$
HOEA represents $HOC_2H_4OC(O)CH=CH_2$;
HOPMA represents $HO(CH_2)_3OC(O)C(CH_3)=CH_2$;
TBAEMA represents $(CH_3)_3CNHC_2H_4OC(O)C(CH_3)=CH_2$;
IEM represents $OCNC_2H_4OC(O)C(CH_3)=CH_2$;
T9 represents stannous octoate (M&T Chemicals, Inc. ; and
T12 represents dibutyl tin dilaurate (M&T Chemicals, Inc.)

TABLE 1

| | Part A | | | | Part B | |
|---|---|---|---|---|---|---|
| Surfactant | Fluorinated Monomer (g, mol) | Solubilizing Monomer (g, mol) | Bifunctional Monomer (g, mol) | n-octylthiol (g, mol) | IEM (g, mol) | Catalyst (g) |
| A[1] | EtFOSEMA 75 g, 0.120 mol | 750A 118 g, 0.146 mol | HOEA 25 g, 0.216 mol | 5 g, 0.034 mol | 32.5 g, 0.21 mol | T9 0.25 g |
| B[2] | EtFOSEMA 7.5 g, 0.0120 mol | 750A 11.8 g, 0.0146 mol | HOPMA 2.5 g, 0.0173 mol | 0.50 g, 0.0034 mol | 2.6 g, 0.0167 mol | T12 0.025 g |
| C[2] | EtFOSEA | 750A | HOEA | 0.50 g, | 3.25 g, | T12 |

TABLE 1-continued

| | Part A | | | | Part B | |
|---|---|---|---|---|---|---|
| Surfactant | Fluorinated Monomer (g, mol) | Solubilizing Monomer (g, mol) | Bifunctional Monomer (g, mol) | n-octylthiol (g, mol) | IEM (g, mol) | Catalyst (g) |
| | 7.5 g, 0.0123 mol | 11.8 g, 0.0146 mol | 2.5 g, 0.0216 mol | 0.0034 mol | 0.021 mol | 0.025 g |
| D[3] | Zonyl BA MA 6.0 g, 0.0114 mol | 750A 9.3 g, 0.0116 mol | HOEA 2.0 g, 0.0172 mol | 0.30 g, 0.0021 mol | 2.7 g, 0.0174 mol | T12 0.025 g |
| E*[4] | EtFOSEMA 10 g, 0.0160 mol | ODMA 6.7 g, 0.0198 mol | HOEA 1.33 g, 0.0115 mol | 0.15 g, 0.0010 mol | 1.7 g, 0.011 mol | T9 0.025 g |
| F[2] | EtFOSEMA 7.5 g, 0.0120 mol | 750A 11.8 g, 0.0146 mol | HOEA 2.5 g, 0.0216 mol | 0.06 g, 0.0004 mol | 3.25 g, 0.021 mol | T9 0.025 |
| G[2] | EtFOSEMA 7.5 g, 0.0120 mol | 750A 11.8 g, 0.0146 mol | HOEA 2.5 g, 0.0216 mol | 1.25 g, 0.0086 mol | 3.25 g, 0.021 mol | T9 0.025 g |
| H[2] | EtFOSEMA 7.5 g, 0.0120 mol | 750A 11.8 g, 0.0146 mol | HOEA 2.5 g, 0.0216 mol | 0.50 g, 0.0034 mol | 3.25 g, 0.021 mol | T9 0.025 |
| I[5] | EtFOSEMA 6.0 g, 0.0096 mol | 750A 9.3 g, 0.0116 mol | HOEA 2.0 g, 0.0172 mol | 0.30 g, 0.0021 mol | 2.6 g, 0.0167 mol | T12 0.025 g |
| J[6] | EtFOSEMA 30 g, 0.0486 mol | 750A 47 g, 0.0584 mol | HOEA 10 g, 0.0862 mol | 1.5 g, 0.0103 mol | 13.1 g, 0.0845 mol | T12 0.125 g |
| K[3] | EtFOSEMA 6.0 g, 0.0096 mol | 750A 9.3 g, 0.0116 mol | HOEA 2.0 g, 0.0172 mol | 0.30 g, 0.0021 mol | 2.6 g, 0.0167 mol | T12 0.025 g |
| L[2] | EtFOSEMA 3.7 g, 0.0059 mol | 750A 15.6 g, 0.0194 mol | HOEA 2.5 g, 0.0216 mol | 0.50 g, 0.0034 mol | 3.25 g, 0.0210 mol | T9 0.025 g |
| M[2] | EtFOSEMA 5.6 g, 0.0090 mol | 750A 13.7 g, 0.0170 mol | HOEA 2.5 g, 0.0216 mol | 0.50 g, 0.0034 mol | 3.25 g, 0.0210 mol | T9 0.025 g |
| N[2] | EtFOSEMA 8.7 g, 0.0139 mol | 750A 10.6 g, 0.0132 mol | HOEA 2.5 g, 0.0216 mol | 0.50 g, 0.0034 mol | 3.25 g, 0.0210 mol | T9 0.025 g |
| O[2] | EtFOSEMA 10.6 g, 0.0170 mol | 750A 8.7 g, 0.0108 mol | HOEA 2.5 g, 0.0216 mol | 0.50 g, 0.0034 mol | 3.25 g, 0.0210 mol | T9 0.025 g |
| P[2] | EtFOSEMA 3.8 g, 0.0061 mol MeFOSEA 3.8 g, 0.0064 mol | 750A 11.8 g, 0.0147 mol | HOEA 2.5 g, 0.0216 mol | 0.50 g, 0.0034 mol | 3.25 g, 0.0210 mol | T9 0.025 g |
| Q[2] | EtFOSEMA 7.5 g, 0.0120 mol | 750A 11.8 g, 0.0147 mol | TBAEMA 2.5 g, 0.0135 mol | 0.50 g, 0.0034 mol | 2.04 g, 0.0132 mol | T12 0.025 |

*Solvent was Solvent 150, a $C_8-C_{11}$ aromatic naphtha (Central Solvent and Chemicals)
[1]Initiator amount: 0.625 g
[2]Initiator amount: 0.06 g
[3]Initiator amount: 0.05 g
[4]Initiator amount: 0.20 g
[5]Initiator amount: 0.10 g
[6]Initiator amount: 0.25 g Molecular weight data were obtained on three surfactants. The only significant variable in the preparation of these compositions was in the amount of chain transfer agent used. The data are set forth in Table 2.

TABLE 2

| | Molecular Weight and Dispersity | | |
|---|---|---|---|
| Surfactant | chain transfer agent (g) | Molecular Weight (wt. ave.) | Dispersity |
| F | 0.0625 | 20,012 | 4.49 |
| G | 1.25 | 12,313 | 1.75 |
| H | 0.5 | 16,974 | 2.38 |

The data in Table 2 show that the amount of chain transfer agent affects the length of the oligomeric shown of the fluorinated compounds.

Surfactant R

Part A

In an approximately 110 mL bottle was placed 7.0 g (0.011 mole) of N-ethyl perfluoro(octane)-sulfonamidoethyl methacrylate, 12.0 g (0.015 mole) of CARBOWAX 750 acrylate (750A), 1.0 g (0.007 mole) of 2-vinyl-4,4-dimethyl-2-oxazoline-5-one (VDM), 32.6 g ethyl acetate, 0.30 g of n-octyl thiol, and 0.20 g azobisisobutyronitrile. The bottle was deaerated under reduced pressure, purged with nitrogen, capped tightly and heated and agitated in a Launder-O-Meter at 75° C. for 16 hours to afford an azlactone-functional intermediate of Formula II. The bottle was removed and allowed to cool to room temperature.

Part B

To the solution from Part A was added 0.66 g (0.006 mole) of 2-hydroxyethyl acrylate and 0.04 g (2 drops) of methane sulfonic acid catalyst. The bottle was then tightly capped and shaken at room temperature (about 22° C.) for 8 hours. IR and NMR analysis of a sample of the resulting amber solution showed no unreacted azlactone groups and indicated the presence of acrylate, fluoroaliphatic, and polyoxyethylene groups.

GMA represents

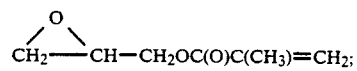

HOEA represents $HOC_2H_4OC(O)CH=CH_2$;
AMC-2 represents chromium octoate in mineral spirits available from Aerojet Strategic Propulsion Co.; and
4-DMAP represents 4-(dimethylamino)pyridine.

TABLE 3

| | Part A | | | | Part B Olefinic | |
|---|---|---|---|---|---|---|
| Surfactant | Fluorinated Monomer (g, mol) | Solubilizing Monomer (g, mol) | Bifunctional Monomer (g, mol) | n-octylthiol (g, mol) | Reagent (g, mol) | Catalyst (g) |
| R[1] | EtFOSEMA 7.0 g, 0.0112 mol | 750A 12 g, 0.0149 mol | DMVA 1.0 g, 0.0072 mol | 0.3 g, 0.0021 mol | HOEA 0.66 g, 0.0057 mol | $CH_3SO_3H$ 0.04 g, |
| S[1] | EtFOSEMA 6.0 g, 0.0096 mol | 750A 10.7 g, 0.0133 mol | DMVA 2.0 g, 0.0144 mol | 0.3 g, 0.0021 mol | HOEA 1.33 g, 0.0115 mol | $CH_3SO_3H$ 0.02 g, |
| T[1] | EtFOSEMA 6.0 g, 0.0096 mol | 750A 7.3 g, 0.0091 mol | DMVA 4.0 g, 0.0288 mol | 0.3 g, 0.0021 mol | HOEA 2.60 g, 0.0224 mol | $CH_3SO_3H$ 0.02 g, |
| U*[1] | EtFOSEMA 10 g, 0.0160 mol | ODMA 6.7 g, 0.0198 mol | DMVA 2.0 g, 0.0144 mol | 0.15 g, 0.0010 mol | HOEA 1.33 g, 0.0115 mol | $CH_3SO_3H$ 0.02 g, |
| V[2] | EtFOSEMA 7.5 g, 0.0120 mol | 750A 11.8 g, 0.0147 mol | GMA 2.5 g, 0.0176 mol | 0.5 g, 0.003 mol | Acrylic Acid 1.12 g, 0.0155 mol | AMC-2 0.16 g, and 4-DMAP 0.16 g, |

*Solvent was Solvent 150, a $C_8$–$C_{11}$ aromatic naphtha (Central Solvent and Chemicals)
[1]Initiator amount: 0.20 g
[2]Initiator amount: 0.06 g

Surfactants S-W

Following the general procedure used to prepare Surfactant R (except that in Surfactant W, Part B. reaction temperature was 70° C. and reaction time was 40 hours), further surfactant compositions were prepared as indicated in Table 3 below, wherein
EtFOSEMA represents $C_8F_{17}SO_2N(C_2H_5)C_2H_4OC(O)C(CH_3)=CH_2$;
DMVA represents 2-vinyl-4,4-dimethyl-2-oxazoline-5one;

EXAMPLES 1-22 AND COMPARATIVE EXAMPLES C1, C2

Surface tension depression properties at four concentrations were obtained for Surfactants A-V in unpolymerized acrylate monomers and mixtures thereof as indicated in Table 4, wherein IOA represents isooctylacrylate (surface tension=27.5 dynes/cm,), and IOA/AA represents isooctylacrylate/acrylic acid 90/10 weight/weight ratio (surface tension=27.8 dynes/cm). A lack of an entry indicates that the value was not measured.

TABLE 4

| | | | SURFACE TENSION (dynes/cm) AND CONCENTRATION | | | | | | |
|---|---|---|---|---|---|---|---|---|---|
| | | Wt. % | 0.01 wt. % | 0.10 wt. % | | 0.50 wt. % | | 1.0 wt. % | |
| Example | Surfactant | fluorine | IOA | IOA | IOA/AA | IOA | IOA/AA | IOA | IOA/AA |
| 1 | A | 15.0 | 23.3 | 21.7 | — | 20.4 | — | 19.1 | — |
| 2 | B | 15.4 | 23.3 | 22.2 | — | 21.9 | — | 21.6 | — |
| 3 | C | 15.3 | 25.1 | 21.9 | — | 20.4 | — | 20.0 | — |
| 4 | D | 18.2 | 23.6 | 21.4 | — | 20.5 | — | 19.4 | — |
| 5 | E | 25.3 | 23.8 | 22.7 | — | 21.9 | — | 21.4 | — |
| 6 | F | 15.0 | 26.0 | 20.0 | — | 19.4 | — | 16.9 | — |
| 7 | G | 15.0 | 25.6 | 21.6 | — | 20.0 | — | 19.3 | — |
| 8 | H | 15.0 | 24.1 | 20.5 | — | 19.2 | — | 18.6 | — |
| 9 | I | 15.0 | — | — | 26.5 | — | 24.0 | — | 24.0 |
| 10 | J | 15.0 | 24.4 | 21.5 | — | 20.3 | — | 19.8 | — |
| 11 | K | 15.0 | 23.2 | 21.4 | 26.5 | 19.7 | 23.5 | 19.4 | 23.0 |
| 12 | L | 7.3 | 27.3 | 25.7 | — | 24.1 | — | 23.1 | — |
| 13 | M | 11.1 | 25.2 | 23.2 | — | 22.0 | — | 21.8 | — |
| 14 | N | 17.3 | 23.7 | 21.4 | — | 19.7 | — | 19.3 | — |
| 15 | O | 21.2 | 22.5 | 20.6 | — | 19.0 | — | 18.6 | — |
| 16 | P | 15.3 | 24.1 | 22.4 | — | 21.7 | — | 21.5 | — |
| 17 | Q | 15.7 | 24.7 | 23.7 | — | 22.0 | — | 21.6 | — |
| 18 | R | 17.0 | 23.4 | 21.3 | 24.5 | 20.3 | 22.5 | 19.7 | 21.5 |
| 19 | S | 15.0 | 25.1 | 23.9 | 24.0 | 23.1 | 23.5 | 22.4 | 23.0 |
| 20 | T | 15.0 | 25.4 | 24.2 | 26.0 | 23.9 | 25.5 | 23.9 | 26.0 |
| 21 | U | 25.0 | 24.9 | 24.3 | 26.5 | 24.0 | 26.0 | 23.6 | 25.5 |
| 22 | V | 16.4 | 25.6 | 22.8 | — | 20.9 | — | 20.0 | — |
| C1 | 1[1] | — | 24.0 | 21.9 | — | 21.0 | — | 20.7 | — |

TABLE 4-continued

| | | SURFACE TENSION (dynes/cm) AND CONCENTRATION | | | | | | |
|---|---|---|---|---|---|---|---|---|
| | | Wt. % | 0.01 wt. % | 0.10 wt. % | | 0.50 wt. % | | 1.0 wt. % | |
| Example | Surfactant | fluorine | IOA | IOA | IOA/AA | IOA | IOA/AA | IOA | IOA/AA |
| C2 | 2[2] | — | 24.9 | 24.3 | 25.0 | 24.0 | 23.5 | 23.6 | 22.5 |
| C3 | TRITON TM X-100[3] | — | — | — | — | — | — | — | 28.0 |

[1] An oligomeric fluorochemical acrylate copolymer surfactant free of polymerizable olefinic unsaturation, commercially available from 3M under the trade designation FLUORAD TM FC-431 coating additive.
[2] An oligomeric fluorochemical acrylate copolymer surfactant free of polymerizable olefinic unsaturation, commercially available from 3M under the trade designation FLUORAD TM FC-740 well stimulation additive.
[3] TRITON TM X-100 octylphenoxy polyethoxyethanol, Rohm and Haas.

The data in Table 4 indicate that these prepolymeric mixtures of the invention, comprising a polymerizable surfactant in combination with an alkyl acrylate or an acrylate-containing mixture, have lower surface energy than the corresponding alkyl acrylate or acrylate-containing mixture. The data further indicate that these prepolymeric mixtures of the invention have surface energy comparable to corresponding compositions comprising a non-polymerizable fluorinated surfactant. On the other hand, Comparative Example C3 shows that non-fluorinated polyoxyethylene surfactants do not substantially reduce the surface energy of an acrylate-containing mixture.

EXAMPLES 23-31

A partially polymerized acrylate-containing mixture was prepared according to the general method set forth in Example 1 of U.S. Pat. No. 4,330,590 (Vesley), using a monomer mixture containing 90 parts by weight isooctyl acrylate, 10 parts by weight acrylic acid, and 0.04 parts by weight 2,2-dimethoxy-2-phenyl acetophenone. The resulting acrylate-containing mixture was partially polymerized by ultraviolet irradiation to a Brookfield viscosity of about 3300 cps. The material was then modified by adding 2,2-dimethoxy-2-phenyl acetophenone (0.15 parts by weight) and 4-(p-methoxyphenyl)-2,6-bis-trichloromethyl-S-triazine (0.15 parts by weight).

The resulting partially polymerized acrylate-containing mixture was incorporated into a pressure-sensitive adhesive transfer tape as follows:

A surfactant (if one is to be used) is added to the partially polymerized acrylate-containing mixture in the desired amount to form a prepolymeric composition of the invention. The composition is then coated at a thickness of 0.05 mm against a low-adhesion carrier using a knife coater. The coated carrier is then irradiated with about 125 mJ/cm$^2$ of ultraviolet radiation (as measured by a DYNACHEM TM Model 500 Radiometer) from a bank of lamps having 90 percent of their radiant energy in the range between 300 nm and 400 nm and having a maximum of 351 nm.

Using the procedures set forth above, compositions of the invention and adhesive transfer tapes incorporating the same were prepared from the components shown in Table 5 below. The compositions were tested according to the methods set forth above. Adhesion data were determined using a stainless steel substrate. Results are shown in Table 5 below, wherein the surfactant was used in an amount of 1 percent by weight based on the weight of the acrylate-containing mixture. (The Table is divided into two parts, each part representing experiments that were run together for the purposes of comparison).

TABLE 5

| | | Surface Tension | Adhesion (ounces per 0.5 in) | | |
|---|---|---|---|---|---|
| Example | Surfactant | (dyne/cm) | IN | RT | 3HA |
| 23 | R | 21.5 | 49 | 94 | 108 |
| 24 | S | 23.0 | 50 | 112 | 110 |
| 25 | T | 26.0 | 32 | 101 | 108 |
| 26 | K | 23.0 | 42 | 110 | 119 |
| 27 | I | 24.0 | 42 | 113 | 127 |
| 28 | J | — | 29 | 83 | 91 |
| C4 | 1[1] | — | 32 | 37 | 35 |
| C5 | — | 30 | 56 | 109 | 115 |
| C6 | — | — | 33 | 68 | 112 |
| C7 | 1[1] | — | 33 | 33 | 42 |
| 29 | D | — | 29 | 49 | 85 |
| 30 | C | — | 39 | 61 | 104 |
| 31 | P | — | 37 | 60 | 104 |

[1] An oligomeric fluorochemical acrylate copolymer surfactant free of polymerizable olefinic unsaturation, available from 3M under the trade designation FLUORAD TM FC-431 coating additive.

The data in Table 5 indicate that these polymeric adhesive compositions of the invention have lower surface energy than corresponding adhesive compositions comprising no surfactant. Table 5 also indicates that, upon accelerated aging, the use of a polymerizable surfactant allows the adhesive composition of the invention to maintain adhesion to stainless steel comparable to that of the comparative examples wherein no surfactant is used. On the other hand, Table 5 shows that the adhesive compositions comprising a non-polymerizable fluorinated surfactant do not maintain good adhesion to stainless steel upon accelerated aging.

EXAMPLES 32-49

Adhesive transfer tapes were prepared according to the general method set forth in Examples 23-31 above. The surfactant and the amount thereof, as well as stainless steel adhesion data for a transfer tape prepared as described above, are set forth in Table 6 below.

TABLE 6

| | | Adhesion (ounces per 0.5 in) | | |
|---|---|---|---|---|
| Example | Surfactant (amount) | IN | 3RT | 3HA |
| 32 | L(0.2%) | 29 | 44 | 75 |
| 33 | L(1.0%) | 31 | 38 | 73 |
| 34 | O(0.2%) | 29 | 39 | 75 |
| 35 | O(1.0%) | 30 | 38 | 74 |
| 36 | V(0.2%) | 31 | 47 | 72 |
| 37 | V(1.0%) | 28 | 33 | 89 |
| 38 | G(0.2%) | 30 | 34 | 76 |
| 39 | G(1.0%) | 27 | 36 | 70 |
| 40 | Q(0.2%) | 28 | 38 | 64 |
| 41 | Q(1.0%) | 31 | 32 | 61 |
| 42 | B(0.2%) | 31 | 33 | 69 |
| 43 | B(1.0%) | 27 | 29 | 70 |
| 44 | E(0.2%) | 29 | 33 | 71 |
| 45 | E(1.0%) | 28 | 37 | 66 |
| 46 | H(0.2%) | 29 | 40 | 75 |
| 47 | H(1.0%) | 32 | 43 | 79 |

TABLE 6-continued

| Example | Surfactant (amount) | Adhesion (ounces per 0.5 in) | | |
|---|---|---|---|---|
| | | IN | 3RT | 3HA |
| 48 | F(0.2%) | 28 | 39 | 81 |
| 49 | F(1.0%) | 29 | 39 | 79 |
| C8 | — | 32 | 42 | 69 |

The data in Table 6 show that these polymeric adhesive compositions of the invention, and also Comparative Example C8, maintain good adhesion to stainless steel even upon accelerated aging.

EXAMPLES 50–55

Adhesive transfer tapes were prepared according to the general method set forth in Examples 23–31 above, using the partially polymerized prepolymeric mixtures, surfactants, initiators, and crosslinkers set forth in Table 7 below. Adhesion tests were carried out using the substrate surfaces designated in Table 7 and the test methods described above. Results are set forth in Table 7, wherein "PC" indicates that a polycarbonate substrate was used for adhesion testing; "ABS" indicates that an acrylonitrile/butadiene/styrene copolymer surface was used for adhesion testing; and "PP" indicates that a polypropylene substrate was used for adhesion testing.

TABLE 7

| | Prepolymeric | Surfactant | Adhesion (ounces per 0.5 inch) | | | | | | | | | | | |
|---|---|---|---|---|---|---|---|---|---|---|---|---|---|---|
| | | | Stainless Steel | | | PC | | | ABS | | | PP | | |
| Example | Mixture | (Parts$^D$) | IN | 3RT | 3HA | IN | 3RT | 3HA | IN | 3RT | 3HA | IN | 3RT | 3HA |
| C9 | IOA/AA$^A$ | FORAL TM -85$^E$ (10) | 44 | 68 | 71 | 43 | 52 | 30 | 36 | 44 | 47 | 30 | 34 | 36 |
| C10 | IOA/AA$^A$ | *$^F$ (0.2) | 35 | 60 | 79 | 40 | 42 | 26 | 36 | 34 | 40 | 28 | 27 | 34 |
| C11 | IOA/AA$^A$ | *$^F$ (1.0) | 37 | 59 | 77 | 42 | 51 | 27 | 35 | 37 | 50 | 29 | 28 | 33 |
| 50 | IOA/AA$^A$ | A (0.2) | 45 | 68 | 76 | 45 | 47 | 29 | 36 | 46 | 41 | 30 | 32 | 31 |
| 51 | IOA/AA$^A$ | A (1.0) | 33 | 52 | 77 | 37 | 43 | 17 | 32 | 39 | 67 | 27 | 29 | 30 |
| C12 | IOA/NVP$^B$ | — | 43 | 51 | 78 | 41 | 54 | 39 | 45 | 45 | 51 | 27 | 31 | 28 |
| C13 | IOA/NVP$^B$ | *$^F$ (0.2) | 41 | 57 | 77 | 40 | 46 | 32 | 45 | 42 | 65 | 24 | 27 | 25 |
| C14 | IOA/NVP$^B$ | *$^F$ (1.0) | 38 | 45 | 76 | 38 | 49 | 26 | 45 | 43 | 61 | 27 | 26 | 25 |
| 52 | IOA/NVP$^B$ | A (0.2) | 43 | 48 | 57 | 42 | 46 | 38 | 44 | 41 | 48 | 26 | 25 | 28 |
| 53 | IOA/NVP$^B$ | A (1.0) | 37 | 35 | 40 | 38 | 34 | 40 | 35 | 37 | 38 | 24 | 27 | 24 |
| C15 | INA/AA$^C$ | — | 45 | 63 | 75 | 30 | 35 | 28 | 41 | 38 | 46 | 10 | 10 | 10 |
| C16 | INA/AA$^C$ | *$^F$ (0.2) | 41 | 46 | 66 | 27 | 35 | 22 | 35 | 35 | 47 | 10 | 12 | 8 |
| C17 | INA/AA$^C$ | *$^F$ (1.0) | 38 | 41 | 58 | 28 | 35 | 20 | 37 | 36 | 41 | 10 | 11 | 10 |
| 54 | INA/AA$^C$ | A (0.2) | 41 | 58 | 134 | 28 | 33 | 24 | 37 | 40 | 49 | 12 | 10 | 9 |
| 55 | INA/AA$^C$ | A (1.0) | 39 | 60 | 126 | 31 | 33 | 22 | 39 | 36 | 50 | 11 | 10 | 9 |

$^A$93.5 parts isooctyl acrylate, 6.5 parts acrylic acid, prepared using 0.15 parts 4-(-p-methoxyphenyl)-2,6-bistrichloromethyl-S-triazine and 0.39 parts 1-benzoylcyclohexanol.
$^B$80 parts isooctyl acrylate, 20 parts N-vinyl pyrrolidinone, prepared using 0.10 parts 4-(-p-methoxyphenyl)-2,6-bistrichloromethyl-S-triazine and 0.14 parts 2,2-dimethoxy-2-phenyl acetophenone.
$^C$90 parts isononyl acrylate, 10 parts acrylic acid, prepared using 0.10 parts 4-(-p-methoxyphenyl)-2,6-bistrichloromethyl-S-triazine and 0.14 parts 2,2-dimethoxy-2-phenyl acetophenone.
$^D$"Parts" are based on 100 parts by weight of the monomers in the acrylate-containing mixture.
$^E$FORAL TM -85 resin is a tackifier composition said to comprise a glycerylester of highly hydrogenated resin, commercially available from Hercules.
$^F$An oligomeric fluorochemical acrylate copolymer surfactant free of polymerizable olefinic unsaturation, commercially available from 3M under the trade designation FLUORAD TM FC-740 well stimulation additive.

The data in Table 7 indicates that those polymeric adhesive compositions of the invention involving a strongly polar copolymerizable monomer (Examples 50, 51, 54, and 55) maintain good adhesion to a variety of substrate materials even upon accelerated aging. Those compositions of the invention involving a moderately polar copolymerizable monomer (Examples 52 and 53) are comparable to the comparative compositions when used with a polycarbonate, ABS, or polypropylene substrate.

Various modifications and alterations of this invention will become apparent to those skilled in the art without departing from the scope and spirit of this invention. It should be understood that this invention is not to be unduly limited to the embodiments set forth herein.

The claimed invention is:

1. A polymeric adhesive composition comprising:
    (a) a major amount of polymerized units derived from an acrylate-containing mixture comprising the monomeric components of an acrylate-based pressure-sensitive adhesive; and
    (b) a minor amount of polymerized units derived from a polymerizable, organic-soluble, oligomeric fluorochemical surfactant comprising one or more fluorinated oligomers, each comprising at least two pendent flouroaliphatic groups, at least two organic-solubilizing groups, and at least one pendent polymerizable olefinic group.

2. An adhesive composition according to claim 1, wherein the fluorinated oligomers comprise an aliphatic backbone having bonded thereto:
    (i) at least two fluoroaliphatic groups, each having a fully fluorinated terminal group;
    (ii) at least one organic-solubilizing group, each comprising a plurality of carbon atoms and may contain one or more catenary oxygen atoms; and
    (iii) at least one polymerizable olefinic group,
    each fluoroaliphatic group, organic-solubilizing group, and polymerizable olefinic group being independently bonded to the aliphatic backbone through a covalent bond, a heteroatom, or an organic linking group.

3. An adhesive composition according to claim 1, wherein the polymerizable fluorochemical surfactant comprises oligomers comprising a portion represented by the formula

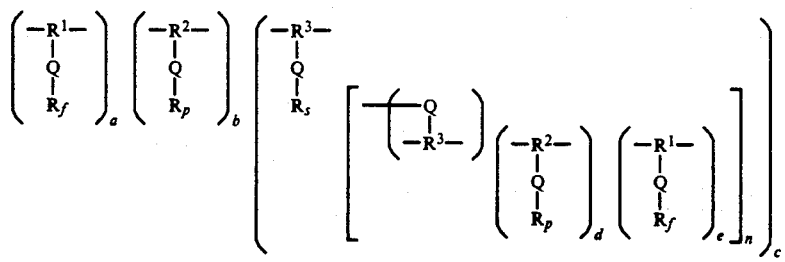

wherein:
R¹, R², and R³ independently represent polymerized units derived from polymerizable olefinic monomers and together form an aliphatic backbone;
each Q independently is a covalent bond, a heteroatom, or an organic linking group;
$R_f$ is a fluoroaliphatic group containing a fully fluorinated terminal group;
$R_s$ is an organic-solubilizing group comprising a plurality of carbon atoms and may contain one or more catenary oxygen atoms;
$R_p$ is a polymerizable olefinic group; and
a, b, c, d, and e are whole numbers such that the compound is oligomeric, and each n is independently zero or one.

4. An adhesive composition according to claim 1, wherein the acrylate-containing mixture comprises a major amount of an alkyl acrylate wherein the alkyl group contains 1 to about 14 carbon atoms and a minor amount of a polar monomer copolymerizable therewith.

5. An adhesive composition according to claim 4, wherein the polar monomer is strongly polar.

6. An adhesive composition according to claim 5, wherein the srongly polar monomer is acrylic acid, itaconic acid, a hydroxyalkyl acrylate, a cyanoalkyl acrylate, acrylamide, or a substituted acrylamide.

7. An adhesive composition according to claim 5 wherein the strongly polar monomer constitutes up to about 25% by weight of the acrylate-containing mixture.

8. An adhesive composition according to claim 4, wherein the polar monomer is moderately polar.

9. An adhesive composition according to claim 8, wherein the moderately polar monomer is N-vinyl pyrrolione, acrylonitrile, vinyl chloride, or diallyl phthalate.

10. An adhesive composition according to claim 8, wherein the moderately polar monomer constitutes up to about 40% of the acrylate-containing mixture.

11. An adhesive composition according to claim 1, wherein the polymerized units derived from the polymerizable surfactant are present in an amount effective to reduce the surface tension of the composition relative to the acrylate-based pressure-sensitive adhesive.

12. An adhesive composition according to claim 1, wherein the polymerized units derived from the polymerizable surfactant are present in an amount of about 0.05 to about 2 percent by weight based on the weight of the composition.

13. An adhesive composition according to claim 1, further comprising hydrophobic silica.

14. An adhesive composition according to claim 1, further comprising polymeric or glass microspheres having an average diameter of 10 to 200 micrometers.

15. An adhesive composition according to claim 1, further comprising a hydrocarbon elastomer.

16. An adhesive composition according to claim 15, wherein the elastomer is present in an amount of about 5 to about 35 parts by weight of the composition based on 100 parts by weight of the composition.

17. An adhesive transfer tape comprising a low-adhesion carrier with a layer of polymeric adhesive composition according to claim 1 thereon.

18. A prepolymeric composition comprising:
(a) an acrylate-containing mixture comprising the monomeric components of an acrylate-based pressure-sensitive adhesive; and
(b) a polymerizable, organic-soluble, oligomeric fluorochemical surfactant composition comprising one or more fluorinated oligomers, each comprising at least two pendent fluoroaliphatic groups, at least two organic-solubilizing groups, and at least one pendent polymerizable olefinic group, the surfactant composition being present in an amount effective to lower the surface tension of the prepolymeric composition relative to the acrylate-containing mixture.

19. A prepolymeric composition according to claim 18, wherein the fluorinated oligomers in the surfactant composition comprise an aliphatic backbone having bonded thereto:
(i) at least two fluoroaliphatic groups, each having a fully fluorinated terminal group;
(ii) at least one organic-solubilizing group, each comprising a plurality of carbon atoms and may contain one or more catenary oxygen atoms; and
(iii) at least one polymerizable olefinic group, each fluoroaliphatic group, organic-solubilizing group, and polymerizable olefinic group being independently bonded to the aliphatic backbone through a covalent bond, a heteroatom, or an organic linking group.

20. A prepolymeric composition according to claim 18, wherein the acrylate-containing mixture comprises a major amount of an alkyl acrylate wherein the alkyl group contains 1 to about 14 carbon atoms and a minor amount of a polar monomer copolymerizable therewith.

21. A prepolymeric composition according to claim 20, wherein the polar monomer is strongly polar.

22. A prepolymeric composition according to claim 21, wherein the strongly polar monomer is acrylic acid, itaconic acid, a hydroxyalkyl acrylate, a cyanoalkyl acrylate, an acrylamides, or a substituted acrylamide.

23. A prepolymeric composition according to claim 21 wherein the strongly polar monomer constitutes up to about 25% by weight of the acrylate-containing mixture.

24. A prepolymeric composition according to claim 20, wherein the polar monomer is moderately polar.

25. A prepolymeric composition according to claim 24, wherein the moderately polar monomer is N-vinyl pyrrolione, acrylonitrile, vinyl chloride, or diallyl phthalate.

26. A prepolymeric composition according to claim 24, wherein the moderately polar monomer constitutes up to about 40% of the acrylate-containing mixture.

27. A prepolymeric composition according to claim 18, wherein the polymerizable surfactant is present in an amount effective to reduce the surface tension of the prepolymeric composition relative to the acrylate-containing mixture.

28. A prepolymeric composition according to claim 18, wherein the polymerizable surfactant is present in an amount of about 0.05 to about 2 percent by weight based on the weight of the prepolymeric composition.

29. A prepolymeric composition according to claim 18, further comprising hydrophobic silica.

30. A prepolymeric composition according to claim 18, further comprising polymeric or glass microspheres having an average diameter of 10 to 200 micrometers.

31. A prepolymeric composition according to claim 18, further comprising a hydrocarbon elastomer.

32. A prepolymeric composition according to claim 31, wherein the elastomer is present in an amount of about 5 to about 35 parts by weight based on 100 parts by weight of the prepolymeric composition.

33. A prepolymeric composition according to claim 18, partially polymerized to a viscosity of about 500 cps to about 50,000 cps.

34. A prepolymeric composition according to claim 18, partially polymerized to a viscosity of about 3000 cps.

35. A process for preparing a pressure-sensitive adhesive composition according to claim 1, comprising the steps of:
   (i) combining the monomeric components of an acrylate-based pressure-sensitive adhesive and a photoinitiator;
   (ii) optionally partially photopolymerizing the composition from step (i) in order to increase its viscosity for coating purposes;
   (iii) combining the polymerizable fluorochemical surfactant with the composition from step (ii) to afford a prepolymeric composition;
   (iv) coating the prepolymeric composition from step (iii) onto a low adhesion carrier; and
   (v) photopolymerizing substantially completely in an inert atmosphere.

* * * * *